US007916359B2

(12) United States Patent
Horade

(10) Patent No.: US 7,916,359 B2
(45) Date of Patent: Mar. 29, 2011

(54) IMAGE FORMING APPARATUS

(75) Inventor: Kenta Horade, Kiyosu (JP)

(73) Assignee: Brother Kogyo Kabusihiki Kaisha, Nagoya-shi, Aichi-ken (JP)

( * ) Notice: Subject to any disclaimer, the term of this patent is extended or adjusted under 35 U.S.C. 154(b) by 567 days.

(21) Appl. No.: 12/053,548

(22) Filed: Mar. 21, 2008

(65) Prior Publication Data

US 2009/0225376 A1 Sep. 10, 2009

(30) Foreign Application Priority Data

Mar. 28, 2007 (JP) ................................ 2007-084775

(51) Int. Cl.
*H04N 1/04* (2006.01)

(52) U.S. Cl. ........ 358/488; 358/401; 358/509; 358/1.12

(58) Field of Classification Search .................. 358/488, 358/401, 509, 1.9, 1.12; 347/101, 104
See application file for complete search history.

(56) References Cited

U.S. PATENT DOCUMENTS

| | | | | |
|---|---|---|---|---|
| 6,039,481 A * | 3/2000 | Ham | | 400/708 |
| 2007/0176955 A1* | 8/2007 | Yoshida | | 347/16 |

FOREIGN PATENT DOCUMENTS

| | | | |
|---|---|---|---|
| JP | H04-241981 A | 8/1992 | |
| JP | H10-016301 A | 1/1998 | |
| JP | 2000-020274 A | 1/2000 | |
| JP | 2001-287405 A | 10/2001 | |
| JP | 2004090316 A | 3/2004 | |
| JP | 2004-122681 A | 4/2004 | |

OTHER PUBLICATIONS

Japan Patent Office, Notification of Reasons for Refusal in Japanese Patent Application No. 2007-084775 (counterpart to the above-captioned U.S. Patent Application) mailed Mar. 10, 2009.

* cited by examiner

*Primary Examiner* — Houshang Safaipour
(74) *Attorney, Agent, or Firm* — Baker Botts L.L.P.

(57) ABSTRACT

An image forming apparatus is provided. The image forming apparatus includes a reciprocal movement unit that reciprocally moves a carriage; a position sensor that detects a location of the carriage; a conveyance unit that conveys a recording medium in a sub-scan direction; an edge detection sensor that detects an edge of the recording medium; a both edge detection unit that detects positions of both edges of the recording medium from positions of the carriage when the edge detection sensor detects each edge of the recording medium; a detection start position determination unit that determines a detection start position; a print control unit that controls the recording head to record data on the recording medium; and a re-detection unit that moves the carriage to the detection start position during printing and that re-detects the edge of the recording medium from the detection start position using the edge detection sensor.

7 Claims, 6 Drawing Sheets

IMAGE FORMING APPARATUS

CROSS REFERENCE TO RELATED APPLICATION

The present application claims priority from Japanese Patent Application No. 2007-084775, which was filed on Mar. 28, 2007, the disclosure of which is herein incorporated by reference in its entirety.

TECHNICAL FIELD

Apparatuses consistent with the present invention relate to an image forming apparatus and, more particularly, to an image forming apparatus that reciprocally moves a carriage having a recording head in a main scan direction and that conveys the recording medium in a sub-scan direction, to thus print an image on the recording medium.

BACKGROUND

Publication of Japanese Unexamined Patent Application No. JP-A-2004-90316 describes a carriage of a related art image forming apparatus. The carriage is equipped with an edge detection sensor for detecting an edge of a recording medium. At the time of commencement of printing, the edge detection sensor detects positions of both edges of the recording medium by means of moving the carriage in the main scan direction. The width of the recording medium is computed from a result of the detection. In accordance with the positions of both edges of the recording medium, the carriage is moved, and the recording head subjects the recording medium to printing.

During the printing operation, the edge detection sensor detects one edge of the recording medium; computes the other edge from the width of the recording medium; re-detects positions of both edges of the recording medium; and moves the carriage in accordance with the re-detected positions of both edges. Thus, even when the recording medium is conveyed while being slightly misaligned, the related art image forming apparatus can accurately print an image, and the image is prevented from being printed on the recording medium in a skewed manner.

SUMMARY

However, if the carriage must travel a long distance to reach the edge of the recording medium, such as when a small recording medium is used, the above-described related-art image forming apparatus consumes extra time each time the edges of the recording medium are re-detected during printing, thus resulting in an increase in print time.

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide an image forming apparatus whose re-detection processing rate is increased.

According to an exemplary embodiment of the present invention, there is provided an image forming apparatus comprising a reciprocal movement unit that reciprocally moves a carriage having a recording head in a main scan direction; a position sensor for detecting a location of the carriage in the main scan direction; a conveyance unit for conveying the recording medium in a sub-scan direction; an edge detection sensor that is mounted on the carriage and that detects an edge of the recording medium; a both edge detection unit that that detects positions of each edge of the recording medium from positions of the carriage detected by the position sensor when the edge detection sensor detects each edge of the recording medium; a detection start position determination unit that determines a detection start position, located outside a width of the recording medium, according to the positions of the edges of the recording medium detected by the both edge detection sensor; a print control unit that controls the recording head to record data on the recording medium by moving the carriage in accordance with detected positions of both edges of the recording medium; and a re-detection unit that moves the carriage to the detection start position during printing and that re-detects the position of the edge of the recording medium from the detection start position using the edge detection sensor.

BRIEF DESCRIPTION OF THE DRAWINGS

Illustrative aspects of the present invention will be described in detail with reference to the following figures wherein.

DETAILED DESCRIPTION OF EXEMPLARY EMBODIMENTS OF THE PRESENT INVENTION

Figure 1:
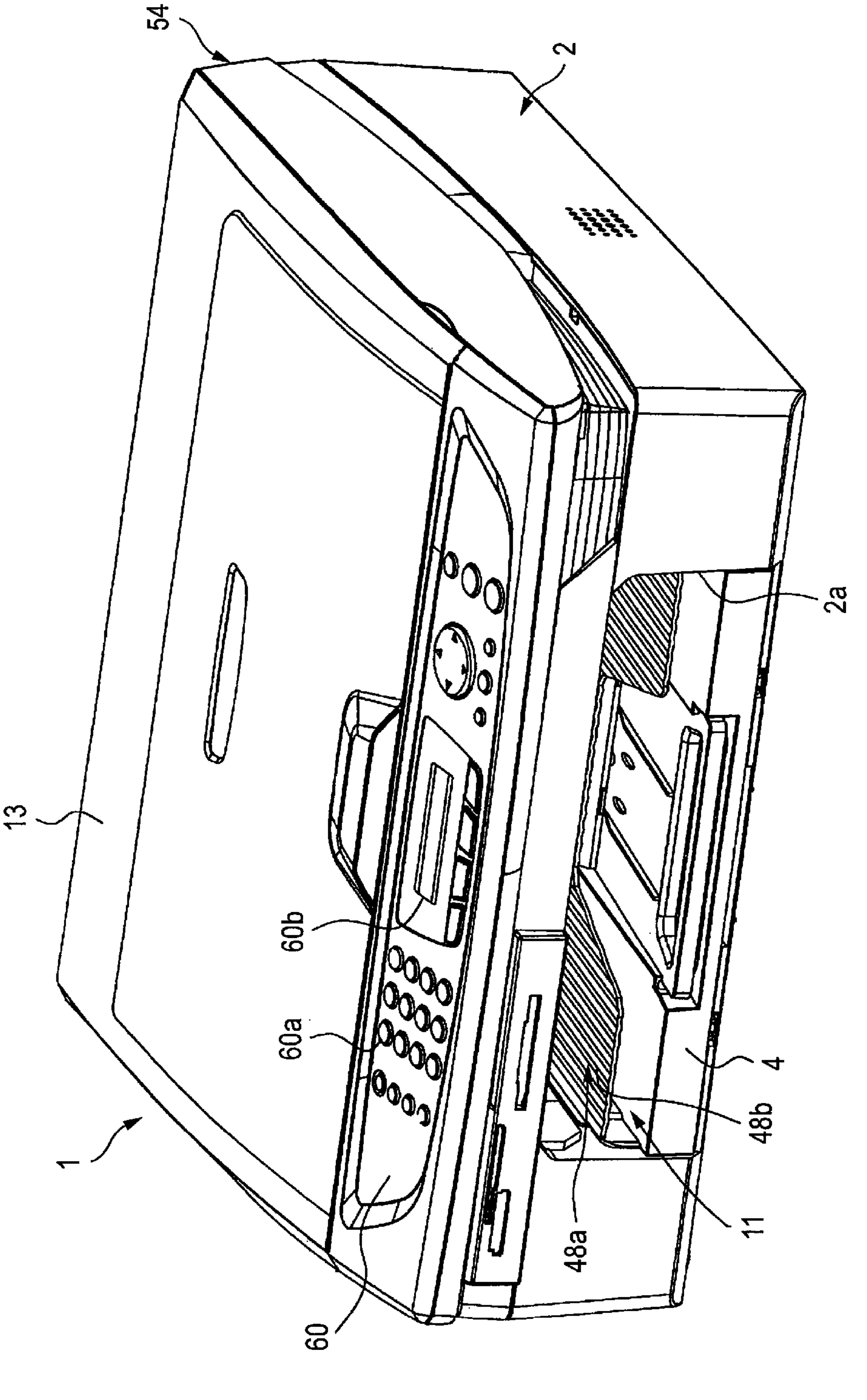
FIG. 1 is a perspective view of an image forming apparatus according to an exemplary embodiment of the present invention.

Exemplary embodiments of the present invention will now be described with reference to the drawings. FIG. 1 is a perspective view of an image forming apparatus that has an inkjet recording head according to an exemplary embodiment of the present invention. And FIG. 2 is a cross-sectional view of a section of the image forming apparatus of FIG. 1.

The image forming apparatus 1 is a multifunction device (MFD) having a printer function, a copier function, a scanner function, and a facsimile function. As shown in FIG. 1, a sheet feeding section 11 for feeding a recording sheet P serving as a recording medium is provided at a bottom of a housing 2. The housing 2 is a main body of the image forming apparatus 1, and the housing 2 is made up of an injection-molded product made of a synthetic resin. In the sheet feeding section 11, a sheet feeding cassette 4 that accommodates recording sheets P in a stacked state is removably provided in the housing 2 by way of an opening section 2*a* formed in the front of the housing 2.

The sheet feeding cassette 4 is built so as to be able to accommodate a plurality of recording sheets P, such as A4-size sheets, letter-size sheets, legal-size sheets, and postcard-size sheets, in a stacked manner while a short side (a width) of the sheet extends in a direction (a main scan direction) orthogonal to a conveyance direction (a sub-scan direction).

Figure 2:
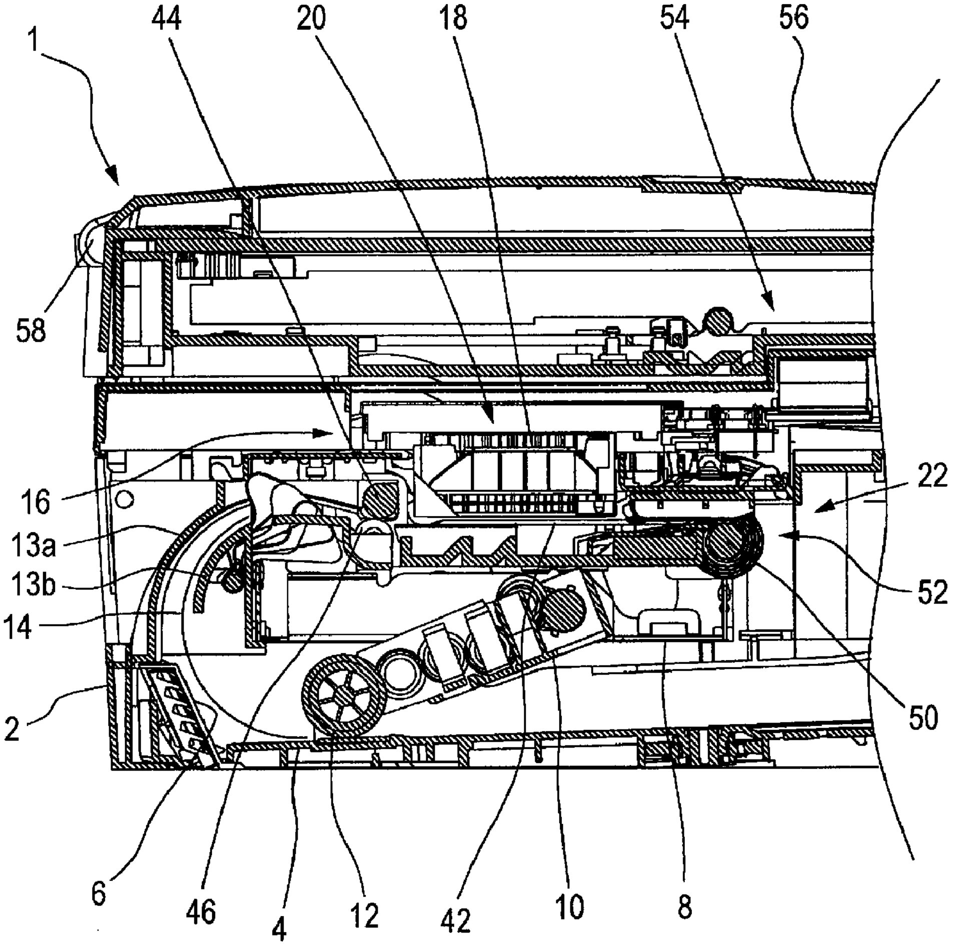
FIG. 2 is a cross-sectional view of a section of the image forming apparatus of FIG. 1.

As shown in FIG. 2, an inclined separation plate 6 for use in separating recording sheets is disposed at a rear side position in the sheet feeding cassette 4. Abase end of a sheet feeding arm 10 is attached to a box-shaped main frame 8 so as to be pivotably rotate in the vertical direction. A feed roller 12, which is rotationally driven by a conveyance motor, is provided at a lower end of the sheet feeding arm 10. The recording sheets P stacked on the sheet feeding cassette 4 are separately conveyed one at a time by means of the feed roller 12 and the inclined separation plate 6.

The separated recording sheet P is conveyed to a print mechanism 16 disposed above the sheet feeding cassette 4 by way of a conveyance passage 14 including a horizontally-oriented, U-shaped path formed between a first conveyance path wall 13*a* and a second conveyance path wall 13*b*, which are formed into a curved shape.

The print mechanism 16 has an inkjet recording head 18 that ejects ink droplets from a lower surface of the recording sheet, to thus print an image on the recording sheet P; and a reciprocal movement mechanism 21 that reciprocally moves a carriage 20 having the recording head 18.

Figure 3:
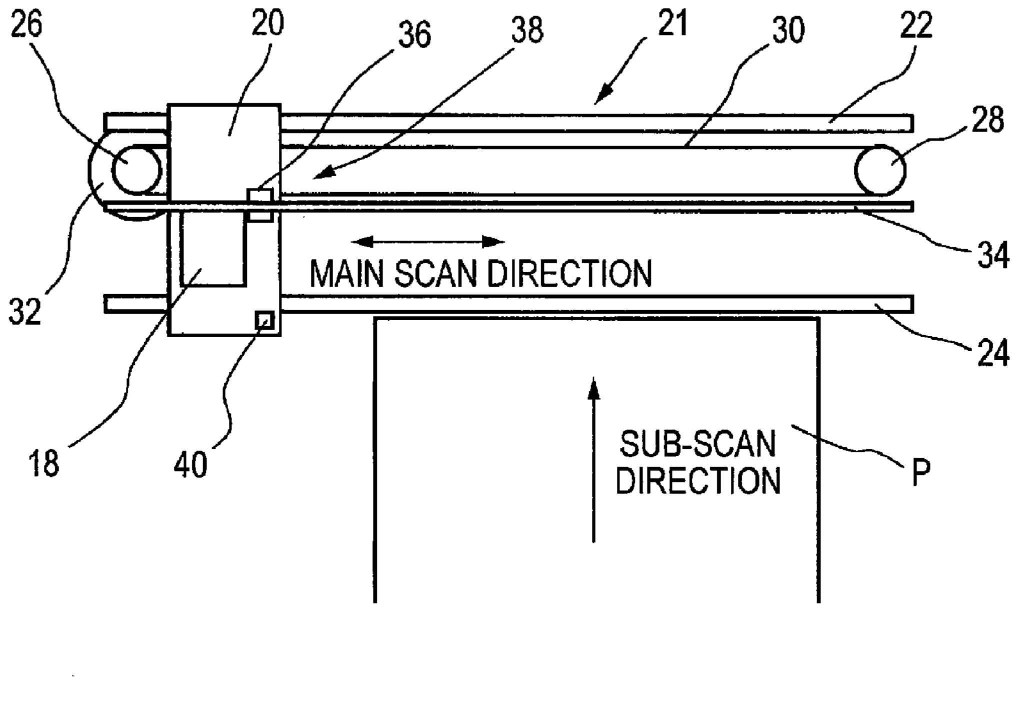
FIG. 3 is a descriptive view showing a general configuration of a reciprocal movement mechanism according to an exemplary embodiment of the present invention.

FIG. 3 is a descriptive view showing a general configuration of the reciprocal movement mechanism of the image forming apparatus 1 of FIG. 1. As shown in FIG. 3, the reciprocal movement mechanism 21 has a pair of guide members 22 and 24 that are provided on the main frame 8 and that are parallel to the main scan direction. The carriage 20 is supported so as to be able to move along the guide members 22 and 24. A timing belt 30 stretched between a pair of pulleys 26 and 28 is provided in parallel to the pair of guide members 22 and 24. The carriage 20 is locked to the timing belt 30.

When the pulley 26 is rotationally driven by a drive motor 32, the carriage 20 is reciprocally moved along the guide members 22 and 24. A belt-shaped encoder strip 34 is stretched in parallel to the guide members 22 and 24. A sensor main unit 36 is provided on the carriage 20. In accordance with a result of detection performed by the encoder strip 34, the sensor main unit 36 outputs a signal responsive to movement of the carriage 20. In this exemplary embodiment, a position sensor 38 comprises the encoder strip 34 and the sensor main body 36.

An edge detection sensor 40 is provided on the carriage 20. In this exemplary embodiment, the edge detection sensor 40 is of an optical type that detects a reflection of illuminated light. When the carriage 20 is reciprocally moved, the edge detection sensor 40 detects an edge of the recording sheet P by means of reflected light which changes when the edge detection sensor has crossed the edge of the recording sheet P.

The carriage 20 is configured so as to wait at a home position that is outside an upper side of the recording sheet P to be conveyed and that is located close to a one end portion of the guide members 22 and 24. In this exemplary embodiment, the edge detection sensor 40 is located at a position on the carriage 20 that is close to the recording sheet P while the carriage 20 is situated at the home position and that is upstream of the recording sheet P with respect to the conveyance direction.

As shown in FIG. 2, a platen 42, which is a flat shape extended in the horizontal direction and which supports the recording sheet P from below so as to oppose the recording head 18, is fastened to the main frame 8 at a position below the lower surface of the recording head 18 of the carriage 20.

As a pair of registration rollers, a drive roller 44 and a driven nip roller 46 that opposes the drive roller 44 from below are arranged at a position upstream of the platen 42 with respect to the conveyance direction. The pair of registration rollers is for conveying the recording sheet P to a position on the upper surface of the platen 42.

A discharge roller 50 and a spur roller (not shown) are disposed at positions downstream of the platen 42 with respect to the conveyance direction. The discharge roller 50 is driven so as to convey the recording sheet P passed by the print mechanism 16 to a sheet discharging section 48 along the conveyance direction. The spur roller opposes the discharge roller 50 and is urged toward the discharge roller 50. In this exemplary embodiment, a conveyance mechanism 52 comprises the feed roller 12, the drive roller 44, the nip roller 46, the discharge roller 50, the spur roller (not shown), and a conveyance motor (not shown), and others.

Returning to FIG. 1, the sheet discharging section 48 is disposed above the sheet feeding section 11. In the sheet discharging section 48, the recording sheet P on which the image is recorded by the print mechanism 16 is discharged in a state in which a recorded surface of the sheet is oriented upward. A sheet discharge port 48*a* is opened so as to become common to the opening section 2*a* in the front of the housing 2. The recording sheet P discharged from the sheet discharging section 48 is accommodated and stacked in a discharge tray 48*b* located in the opening section 2*a*.

An image reading section 54 for the copier function and the facsimile function is disposed in an upper part of the housing 2. That is, an image reading section 54 has a function for reading a document. A rear end of a document cover unit body 56 covering an upper surface of the image reading section 54 is attached to a rear end of the image reading section 54 so as to be able to vertically and pivotably rotate around a pivot 58. A control panel section 60 having various control buttons 60*a*, a liquid-crystal display section 60*b*, and the like, is provided forward of the image reading section 54 and on the upper side of the housing 2.

Figure 4:
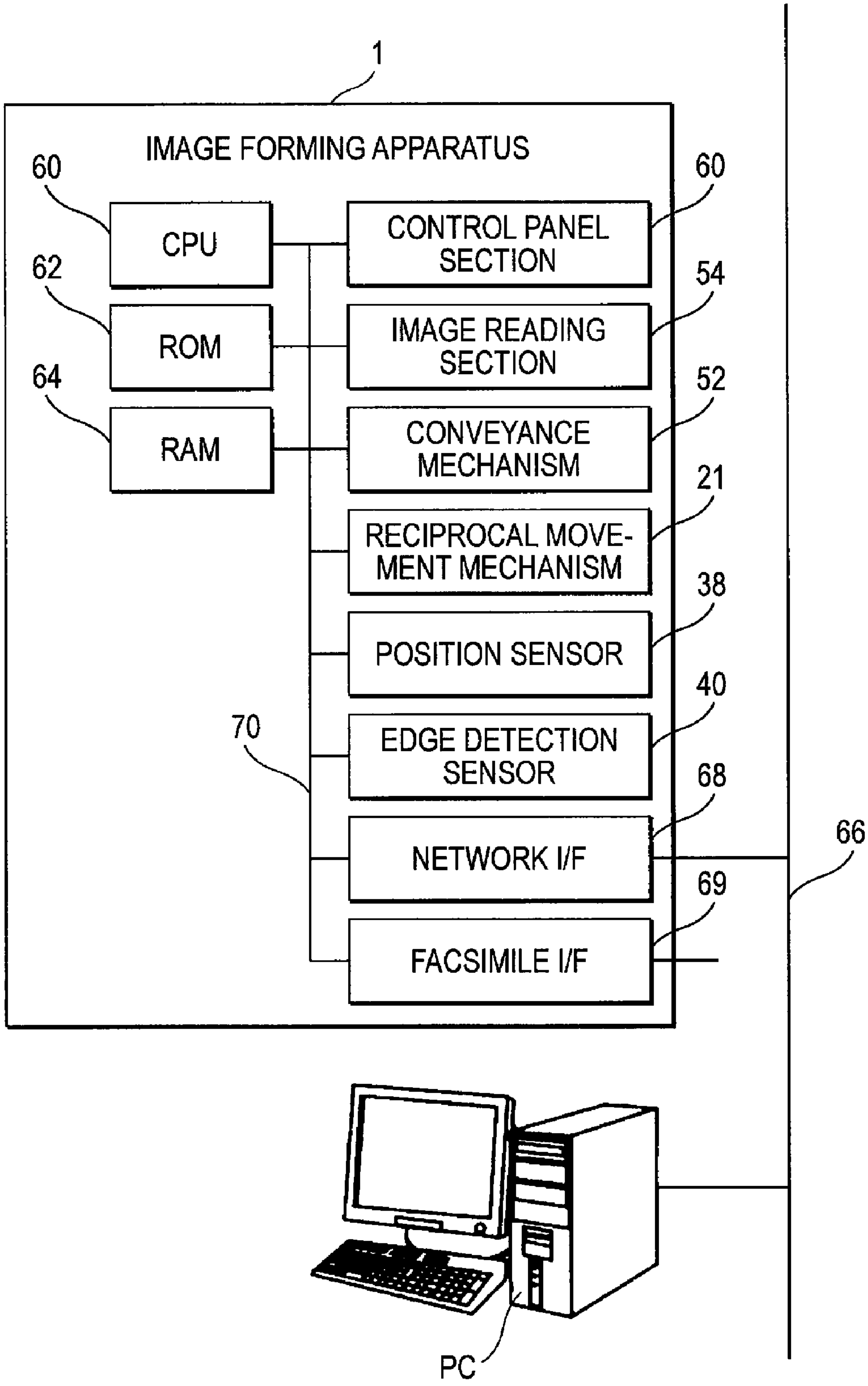
FIG. 4 is a block diagram showing an electrical configuration of the image forming apparatus of FIG. 1.

FIG. 4 is a block diagram showing an electrical system of the image forming apparatus 1. The image forming apparatus 1 has a central processing unit (CPU) 60 for executing a processing program; a read only memory (ROM) 62 for storing the processing program, and the like; a random access memory (RAM) 64 for temporarily storing processing results, and the like; the control panel section 60; the image reading section 54; the conveyance mechanism 52; the reciprocal movement mechanism 21; the position sensor 38; the edge detection sensor 40; a network interface 68 coupled to an external PC, such as a personal computer, by way of a network 66, such as a LAN; and a facsimile interface 69. Each of these components is able to mutually exchange data by way of a bus 70.

The image forming apparatus 1 creates image data by storing, in frame memory within the RAM 64, print data supplied from the external device PC by way of the network interface 68. According to the image data stored in the frame memory within the RAM 64, the conveyance mechanism 52, the reciprocal movement mechanism 21, the recording head 18, and the like, are controlled, whereby an image is printed on the recording sheet P. Printing may be color printing or monochrome printing. Although this exemplary embodiment of the present invention will be described in relation to an inkjet recording head 18, the print mechanism 16 of the present invention is not limited to an inkjet recording head 18. A print mechanism having an ink ribbon recording head may also be employed, so long as the mechanism reciprocally moves the carriage 20 having the recording head 18 in the main scan direction.

Figure 5:
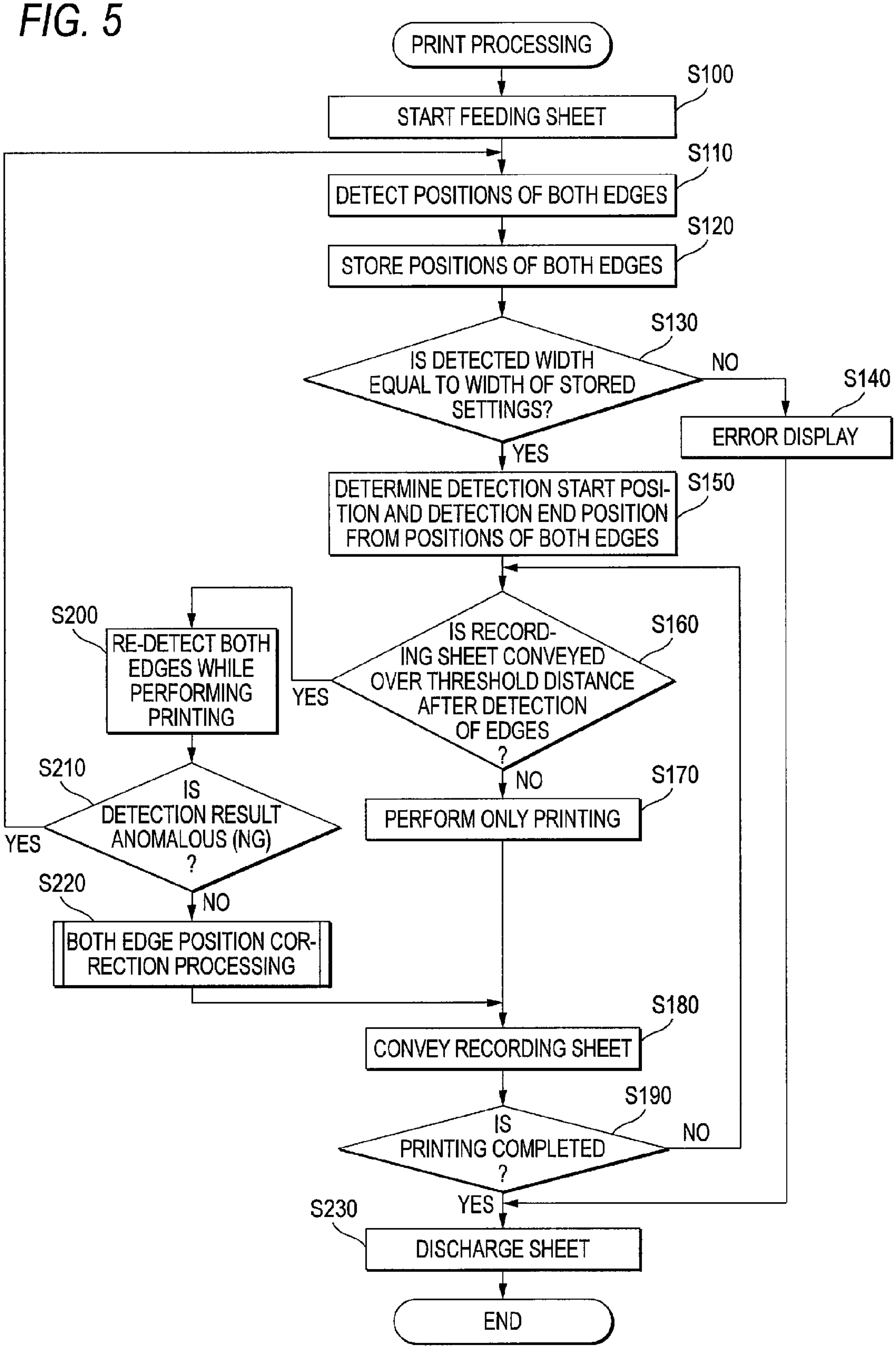
FIG. 5 is a flowchart showing print processing according to an exemplary embodiment of the present invention.

Print processing performed by the image forming apparatus 1 will now be described by reference to the flowchart shown in FIG. 5. FIG. 5 is a flowchart showing print processing according to an exemplary embodiment of the present invention.

When the print data are input from the external device PC by way of the network interface 68, print processing is performed. First, the feed roller 12 of the conveyance mechanism 52 is driven, to thus commence sheet feeding for conveying the recording sheet P from the sheet feeding cassette 4 to the conveyance passage 14 at operation S100.

The recording sheet P is conveyed between the drive roller 44 and the nip roller 46 by way of the conveyance passage 14 and further conveyed onto the platen 42 by means of the drive roller 44 and the nip roller 46. When the recording sheet P is conveyed to the print mechanism 16, detection of positions of both edges of the recording sheet P is performed (S110), and the thus-detected positions of both edges are stored in the RAM 64 (S120).

During detection of both edge positions, the reciprocal movement mechanism 21 moves the carriage 20 from the home position along the guide members 22 and 24, and the position of the carriage 20 being moved is detected by the position sensor 38. In conjunction with movement of the carriage 20, the edge detection sensor 40 performs a detection of the edges of the recording sheet P.

When the edge detection sensor 40 arrives at one edge of the recording sheet P, a change arises in reflected light, and the edge detection sensor 40 detects one edge of the recording sheet P. The position detected by the position sensor 38 when the edge detection sensor 40 detects the edge is stored as the position of the one edge in the RAM 64.

When the carriage 20 is moved along the guide members 22 and 24 after having traversed the recording sheet P and when the edge detection sensor 40 arrives at an other edge of the recording sheet P, a change arises in reflected light, and the edge detection sensor 40 detects the other edge of the recording sheet P. The position of the edge detected by the position sensor 38 when the edge detection sensor 40 detects the edge is stored as the position of the other edge in the RAM 64.

Even after detection of the other edge, the carriage 20 is further moved along the guide members 22 and 24. The carriage 20 is moved up to the other ends of the guide members 22 and 24, and the edge detection sensor 40 detects the edge of the recording sheet P. As mentioned above, the carriage 20 is moved over the entire range of reciprocal movement, and the edge of the recording sheet P is detected.

When the positions of both edges are detected (S110) and when the positions of both edges of the recording sheet P are stored (S120), it is determined whether the width of the recording sheet P coincides with a width set according to settings (S130). The width of the conveyed recording sheet P is computed from an interval between the positions of both edges stored in the RAM 64. The width set according to settings is; for example, a width of the recording sheet P set when printing is instructed by means of the external device PC.

The width detected by means of execution of processing pertaining to S110 and S120 is compared with the set width. If it is determined that the detected width of the recording sheet P does not coincide with the set width (NO in S130), an error message to the effect that no coincidence exists in the size of the recording sheet P, or the like, is displayed on a display section 60*b*; or a signal showing that no coincidence exists in size is output to the external device PC, and an error message is displayed on a display, or the like, of the external device (S140).

For instance, when the size of the recording sheet P accommodated in the sheet feeding cassette 4 is different from the size of the settings sent from the external device PC, an error display is provided. Further, when the recording sheet P conveyed from the sheet feeding cassette 4 is damaged or when the recording sheet P is conveyed while being folded, an error is displayed.

On the other hand, if it is determined that the detected width of the recording sheet P coincides with the width of the settings (YES in S130), a detection start position and a detection end position are determined from the positions of both edges (S150). The detection start position and the detection end position are set outside of the width of the recording sheet P. It is advantageous to determine the detection start position and the detection end position through an experiment, or the like, in such a way that, even when both edges of the recording sheet P are slightly deviated from the stored positions of both edges as a result of slightly skewed conveyance of the recording sheet P during printing operation, the edges of the recording sheet P fall within a range between the detection start position and the detection end position. And a space between the detection start position and the detection end position is a space which is as small as possible and which is wider than the width of the recording sheet P is achieved between the positions.

Specifically, it is advantageous to set a detection start position and a detection end position at positions that are outside the width of the recording sheet P and that are close to both edges of the recording sheet P. The detection start position and the detection end position are determined from the stored positions of both edges such that the edge detection sensor 40 can detect both edges of the recording sheet P being conveyed during printing operation when the carriage 20 is moved from the detection start position to the detection end position.

After the edge detection sensor 40 has detected the edges of the recording sheet P subsequent to determination of the detection start position and the detection end position, it is determined whether the conveyance mechanism 52 has conveyed the recording sheet P over a threshold distance in the direction of conveyance (S160).

If it is determined that the recording sheet P is not conveyed over the threshold distance (NO in S160), only a printing operation is performed (S170). In printing, the carriage 20 is moved to the print start position by controlling the reciprocal movement mechanism 21, and the recording head 18 is driven while the carriage 20 is being moved along the guide members 22 and 24, to thus eject ink droplets and perform printing for one path on the recording sheet P in accordance with print data.

After printing for one path, the conveyance mechanism 52 is controlled, thereby intermittently conveying the recording sheet P over a distance corresponding to one path in the conveyance direction (S180). It is then determined whether printing of one recording sheet P is completed (S190). If it is determined that printing is not completed (NO in S190), the process returns to operation S160, to thus reciprocally move the carriage 20 until conveyance is performed by a certain amount and cause the recording head 18 to subject the recording sheet P to recording.

Figure 6A:
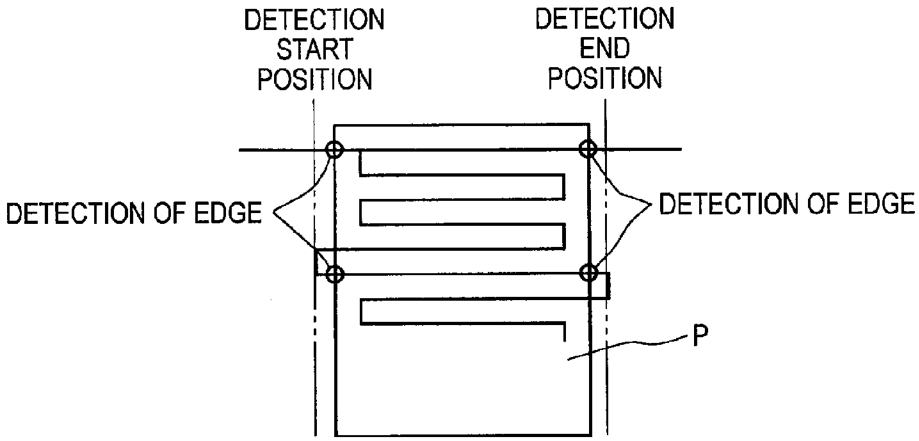
FIGS. 6A to 6C are descriptive views showing a locus of a carriage achieved when a recording sheet is subjected to printing by the image forming apparatus of FIG. 1.
Figure 6B:
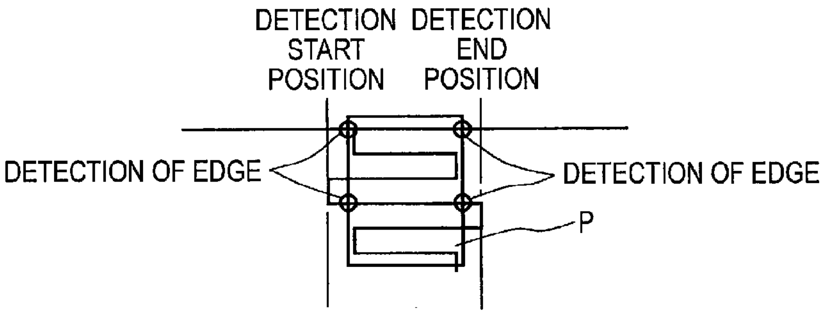
Figure 6C:
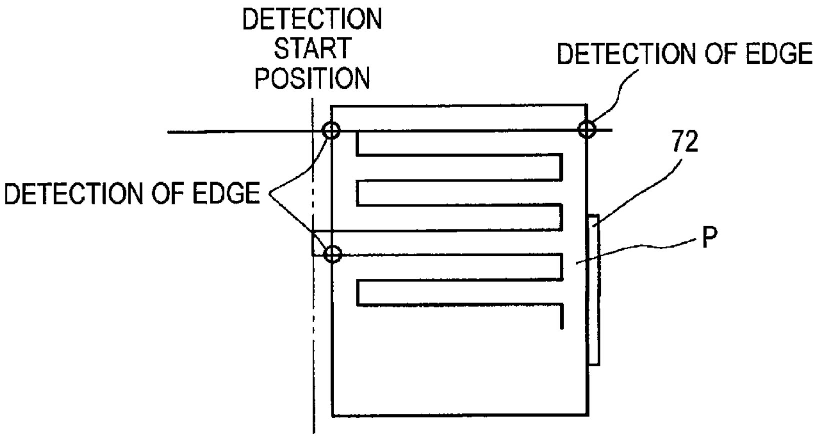

With respect to the reciprocal movement of the carriage and the conveyance of the sheet, FIGS. 6A-6C are descriptive views showing a locus of the carriage 20 achieved when the recording sheet P is subjected to printing. For instance, as shown in FIG. 6A, when a margin is set on both side of the recording sheet P under print conditions set by the external device PC, the carriage 20 is moved between a print start position and a print end position on the basis of the positions of both edges stored through processing pertaining to operations S110 and S120 and in consideration of the margins, whereby the recording sheet P is subjected to recording.

After printing for one path, the recording sheet P is intermittently conveyed, in accordance with printing for the next one path, over a distance corresponding to one path in the conveyance direction, thereby moving the carriage 20 between the print start position and the print end position and subjecting the recording sheet P to printing for the next one path. When it is determined that these processing operations have been iterated a number of times, to thus convey the recording sheet over a set distance after detection of edges performed in S110 (YES in S160), both edges are re-detected while printing is being performed (S200).

In re-detection of both of the edges, the carriage 20 is moved to the detection start position determined by performance of processing pertaining to S150. One edge of the recording sheet P is determined by means of the edge detection sensor 40 while the carriage 20 is being moved from the detection start position, and the position of the carriage 20 achieved at that time is detected by means of the position sensor 38, and a result of detection is taken as the position of one edge.

The carriage 20 is moved further to the detection end position while printing for one path is being performed between the print start position and the print end position. In the middle of the carriage moving to the detection end position, the other edge of the reading sheet P is detected by the edge detection sensor 40, and the position of the carriage 20 achieved at that time is detected by the position sensor 38. A result of detection is taken as the position of the other edge.

Accuracy in detection of the position of the edge achieved in processing pertaining to S110 should be equal to or higher than accuracy in detection of the position of the edge achieved by the edge detection sensor 40 at the time of performance of processing pertaining to S200. At the time of performance of processing pertaining to S200, it is advantageous to increase a time interval between illumination operations of the edge detection sensor 40, thereby enhancing the rate of processing for detecting an edge.

Although both the detection start position and the detection end position are determined, this exemplary embodiment is not limited to this. It is also possible to only determine the detection start position, and the carriage 20 is moved in excess of the other edge without determination of a detection end position while printing is being performed. At this time, it may also be possible to detect the other edge of the recoding sheet P by means of the edge detection sensor 40; to detect the position of the carriage 20 achieved at that time by means of the position sensor 38; to take the result of detection as the position of the other edge; and to switch movement of the carriage 20 to an opposite direction while the thus-detected edge position is taken as a detection end position.

Further, even when the edge detection sensor 40 detects the other edge, it may also be the case where printing for one path will not be completed depending on the size of a margin and the layout position of the edge detection sensor 40. In such a case, the carriage 20 will be moved further in excess of the position where the edge detection sensor 40 has detected the other edge. At that time, the detection end position may also be determined in consideration of the print end position for one path. Alternatively, the position where the edge detection sensor 40 has detected the other edge may also be taken directly as a detection end position without determination of the detection end position. When the detection end position is attained, the edge detection sensor 40 may also halt detection.

Positions of both edges are detected through processing pertaining to operations S110 and S120, and positions of both edges are re-detected by means of processing pertaining to operation S200. It is determined whether the result of detection is anomalous (NG) on a basis of the re-detected positions of both edges (S210).

To determine whether NG is detected, a difference between the positions of both edges detected through processing pertaining to operations S110 and S120 and the positions of both edges detected during printing is computed. If it is determined that the difference is equal to or greater than a threshold amount; for example, a displacement of about 0.5 mm or more, the recording sheet P is conveyed in a skewed manner, so that proper printing cannot be performed. Therefore, the detection result is determined to be NG.

If it is determined that the difference between the positions of both edges is smaller than the threshold amount, the detection result is determined not to be NG (NO in S210), and processing for correcting the positions of both edges is carried out (S220). During correction processing, the positions of both edges newly detected through processing pertaining to operation S200 are stored in place of the positions of both edges stored through processing pertaining to operation S120. Subsequently, printing is performed on the basis of the new positions of both edges, so that printing parallel to both edges of the recording sheet P with given margins is performed.

After performance of correction processing, the process returns to operation S180, thereby intermittently conveying the recording sheet P. If printing is not yet completed, the process returns to operation S160, thereby subjecting the recording sheet P to printing for one path (S170) and intermittently conveying the recording sheet P by a distance corresponding to one path (S180). If conveyance is determined to have been performed again over a predetermined given distance after detection of the edges pertaining to S200 (YES in S160), both edges are re-detected while printing is being performed (S200).

In the meantime, there is computed, by means of processing pertaining to operation S210, a difference between the positions of both edges detected through processing pertaining to operation S110 and S120 and the positions of both edges detected through processing pertaining to S200. If the difference is equal to or greater than the threshold amount or if a difference between positions of both edges detected through processing pertaining to previous operation S200 and positions of both edges detected through current processing pertaining to operation S200 is computed and determined to be equal to or greater than a threshold amount, NG is determined to be achieved (YES in S210), and processing returns to operation S110.

Processing returns to operation S110, to thus move the carriage 20 over the entire range of reciprocal movement and detect both edges of the recording sheet P (S110), and the positions of both edges are stored (S120). The width of the recording sheet P is computed from the re-detected positions of both edges, and it is determined whether the width of the recording sheet coincides with the width of the recording sheet of the settings (S130).

If it is determined that no coincidence is achieved (NO in S130), it is determined that proper printing cannot be continually performed as a result of the recording sheet P being folded in the middle of conveyance performed during printing or that proper printing cannot be continually performed as a result of the recording sheet P being damaged, and an error display is provided (S140).

If the width is determined to coincide with the width of the settings as a result of re-detection of positions of both edges (YES in S130), the detection start position and the detection end position are again determined in accordance with the re-detected positions of both edges (S150). Since a slight deviation exists in the recording sheet P, the detection start position and the detection end position are re-determined on the basis of the re-detected positions of both edges, thereby preventing the edge detection sensor 40 from failing to detect the edges of the recording sheet P.

After determination of the detection start position and the detection end position, processing returns to operation S160. Print data are printed on the recording sheet P while the positions of both edges of the recording sheet P are being re-detected every time the recording sheet is conveyed over a predetermined distance. If printing is determined to be completed by performance of processing pertaining to operation S190 (YES in S190), the recording sheet P is discharged to the discharge tray 48*a* by controlling the conveyance mechanism 52. Moreover, even after an error display has been provided through processing pertaining to S140, the recording sheet P is discharged as-is to the discharge tray 48*a*. After discharge of the recording sheet, print processing is temporarily stopped. When the next recording sheet P is continually printed, print processing is again performed.

In this exemplary embodiment, performance of processing pertaining to operations S110 and S120 acts as a both edge detection unit; performance of processing pertaining to S150 acts as a detection start position determination unit; performance of processing pertaining to S170 acts as a print control unit; and performance of processing pertaining to S200 acts as a re-detection unit.

As mentioned above, when the recording sheet P is subjected to printing, at least the detection start position is determined from the positions of the edges by means of performance of processing pertaining to S150. A travel distance of the carriage 200 achieved when the positions of both edges of the recording sheet P are re-detected becomes shorter as a result of performance of processing pertaining to operations S160 and S200, so that an increase in re-detection processing rate and shortening of a print time can be achieved.

In particular, as shown in FIG. 6B, if the recording sheet P is of small size like a postcard, the width of the recording sheet P, such as a postcard, is smaller than the entire range of reciprocal movement of the carriage 20. At the time of printing of such a recording sheet P, a detection start position and a detection end position corresponding to the recording sheet P, such as a postcard, are determined from the positions of both edges by means of performance of previously-described processing pertaining to operation S150. A travel distance of the carriage 20 achieved when the positions of both edges of the recording sheet P are re-detected becomes shorter as a result of performance of processing pertaining to operations S160 and S200, whereby a processing time for re-detection can be shortened.

The foregoing exemplary embodiment has described, as an example, the case where the so-called recording sheet P is conveyed while being aligned to the center reference and where positions of both edges of the recording sheet P are re-detected. However, according to the another exemplary embodiment, as shown in FIG. 6C, if the recording sheet P is conveyed while being aligned to a single side reference along a reference plate 72, processing pertaining to operations S110 to S130 is performed, thereby likewise detecting positions of both edges of the recording sheet P and computing the width of the recording sheet P. At the time of performance of processing pertaining to operation S150, a detection position is determined from the position of the edge of the recording sheet P opposite to the reference plate 72. And, at the time of performance of processing pertaining to S200, the edge of the recording sheet P opposite to the reference plate 72 is re-detected.

In the foregoing exemplary embodiment, printing is performed by driving the recording head 18 at the time of forward and backward movement of the carriage 20. However, the present inventive concept is not limited to this. Even when printing is performed by driving the recording head 18 only at the time of forward movement of the carriage 20; the carriage is moved back without ejection of ink droplets during backward movement; and printing is performed during forward movement, even in such a case, the present inventive concept can be practiced likewise.

In the exemplary embodiments of the present invention, when the position of the edge detected by the re-detection unit is displaced from the edge position detected from the both edge detection unit, the both edge detection unit may also be configured so as to re-detect positions of both edges of the recording medium. Moreover, when a width of the recording medium computed from the positions of both edges detected by the both edge detection unit differs from a previously-set width of the recording medium, an error display may also be provided. Furthermore, the both edge detection unit may detect edges of the recording medium within an entire range of reciprocal movement by controlling the reciprocal movement unit.

Moreover, the re-detection unit may make a correction to the positions of the edges detected by the both edge detection unit based on the positions of the edges detected by the re-detection unit. Accuracy in detection of the positions of the edges achieved by the both edge detection unit may also be configured so as to become higher than accuracy in detection of the positions of the edges achieved by the re-detection unit. Moreover, the re-detection unit may also be configured so as to re-detect the positions of both edges of the recording medium from the detection start position using the edge detection sensor.

At a time of printing of a recording medium, the image forming apparatus according to exemplary embodiments of the present invention determines a detection start position on the basis of the position of an edge. Hence, a travel distance of the carriage achieved when the position of the edge of the recording medium is re-detected becomes shorter, so that there is yielded an advantage of increasing a re-detection processing rate and shortening a print time.

When the positions of the edges detected by the re-detection unit are displaced, the positions of both edges of the recording medium are re-detected by means of the both edge detection unit, whereby both an increase in re-detection processing rate and enhancement of detection accuracy can be achieved. Moreover, when the width of the recording medium computed from the detected positions of both edges is different from the previously-set width of the recording medium, an error display is provided, thereby enabling reporting of the difference to the user.

The both edge detection unit detects edges of a recording medium over an entire range of reciprocal movement, whereby an anomaly in the recording medium can be detected reliably. The re-detection unit makes a correction to the positions of the edges detected by the both edge detection unit based on the positions of the edges by the re-detection unit, thereby enabling subjecting of a recording medium to parallel printing. Moreover, the accuracy in detection of the positions of the edges achieved by the both edge detection unit is made higher than the accuracy in detection of the positions of the edges achieved by the re-detection unit, whereby both an increase in re-detection processing rate and enhancement of detection accuracy can be achieved. Furthermore, the re-detection unit re-detects the positions of both edges of the recording medium from the detection start position by means of the edge detection sensor. As a result, when the recording medium is conveyed along the center reference, the medium can be subjected to printing with superior accuracy.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. An image forming apparatus comprising:

a reciprocal movement unit that reciprocally moves a carriage having a recording head in a main scan direction;

a position sensor that detects a location of the carriage in the main scan direction;

a conveyance unit that conveys a recording medium in a sub-scan direction;

an edge detection sensor that is mounted on the carriage and that detects an edge of the recording medium;

a both edge detection unit that detects positions of both edges of the recording medium from positions of the carriage detected by the position sensor when the edge detection sensor detects each edge of the recording medium;

a detection start position determination unit that determines a detection start position, located outside a width of the recording medium, according to the positions of the edges of the recording medium detected by the both edge detection unit;

a print control unit that controls the recording head to record data on the recording medium by moving the carriage in accordance with the detected positions of both edges of the recording medium; and a re-detection unit that moves the carriage to the detection start position during printing and that re-detects the position of the edge of the recording medium from the detection start position using the edge detection sensor.

2. The image forming apparatus according to claim 1, wherein, when the position of the edge detected by the re-detection unit is displaced from the edge position detected by the both edge detection unit, the both edge detection unit again detects positions of both edges of the recording medium.

3. The image forming apparatus according to claim 1, wherein, when a width of the recording medium computed from the positions of both edges detected by the both edge detection unit differs from a previously-set width of the recording medium, an error display is provided.

4. The image forming apparatus according to claim 1, wherein the both edge detection unit detects edges of the recording medium within an entire range of reciprocal movement by controlling the reciprocal movement unit.

5. The image forming apparatus according to claim 1, wherein the re-detection unit makes a correction to the positions of the edges detected by the both edge detection unit based on the positions of the edges detected by the re-detection unit.

6. The image forming apparatus according to claim 1, wherein an accuracy in detection of the positions of the edges achieved by the both edge detection unit is higher than an accuracy in detection of the positions of the edges achieved by the re-detection unit.

7. The image forming apparatus according to claim 1, wherein the re-detection unit re-detects the positions of both edges of the recording medium from the detection start position using the edge detection sensor.

* * * * *